Figure 11:
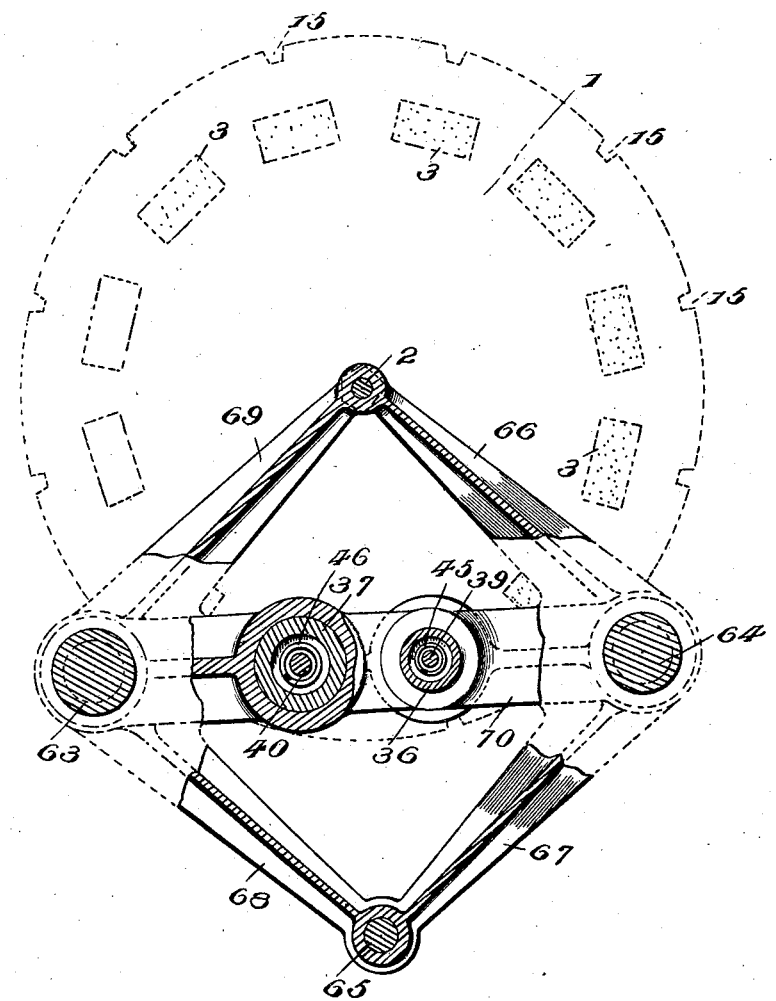

No. 861,903.
PATENTED JULY 30, 1907.
C. A. O. ROSELL.
BLOCK PRESS.
APPLICATION FILED JULY 22, 1903.
9 SHEETS—SHEET 1.
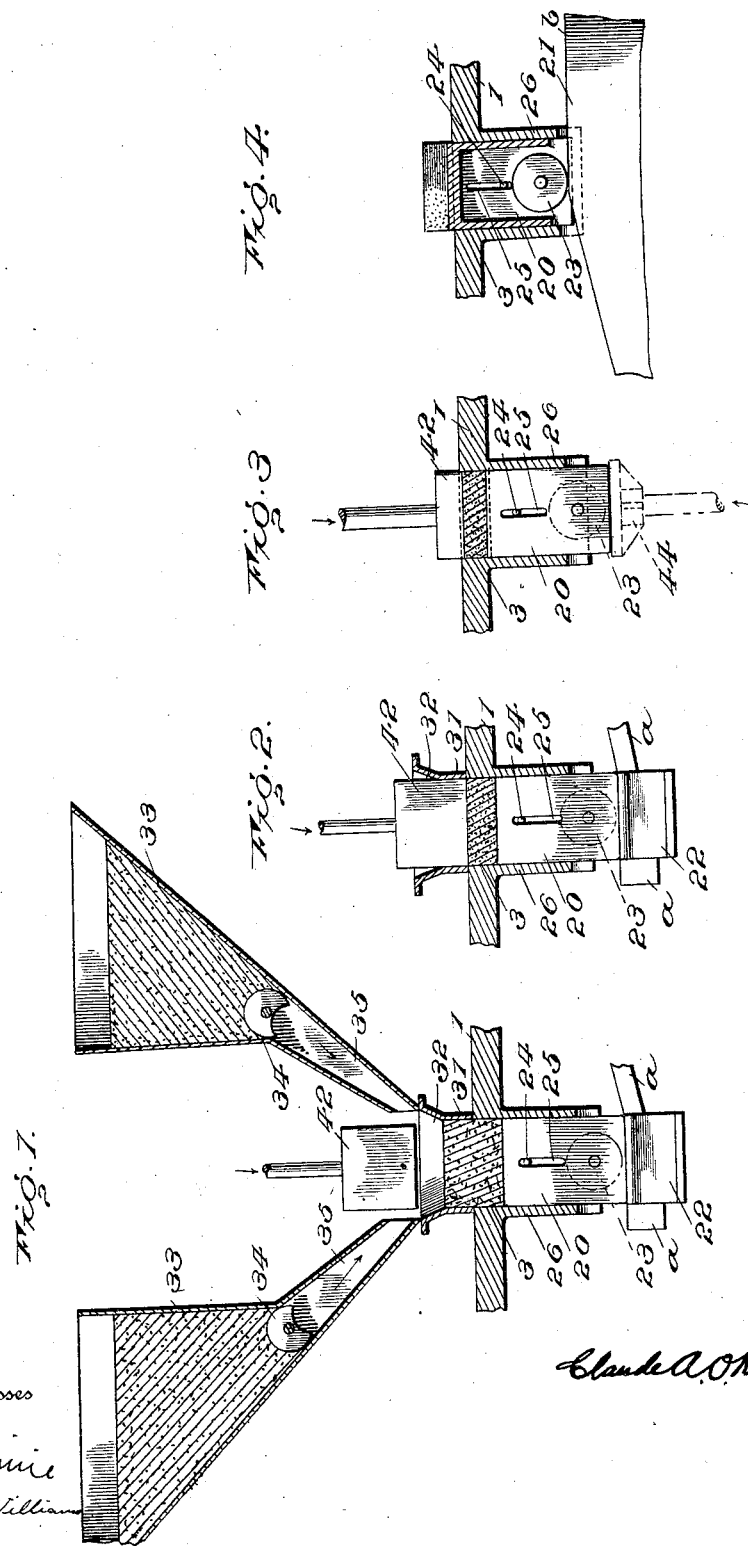
Witnesses
Inventor
Claude A. O. Rosell No. 861,903. PATENTED JULY 30, 1907.
C. A. O. ROSELL.
BLOCK PRESS.
APPLICATION FILED JULY 22, 1903.
9 SHEETS—SHEET 2.
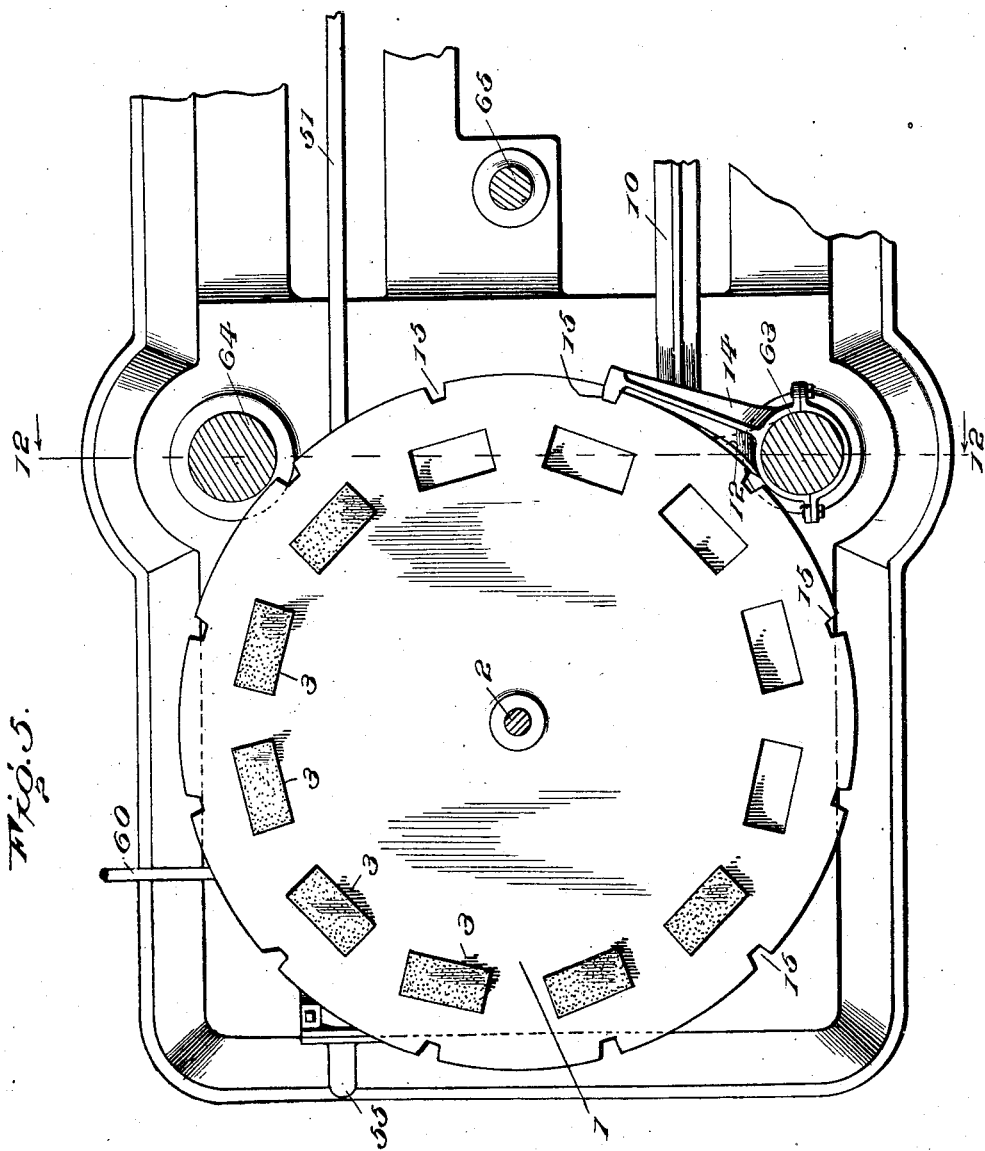

No. 861,903.
PATENTED JULY 30, 1907.
C. A. O. ROSELL.
BLOCK PRESS.
APPLICATION FILED JULY 22, 1903.
9 SHEETS—SHEET 3.
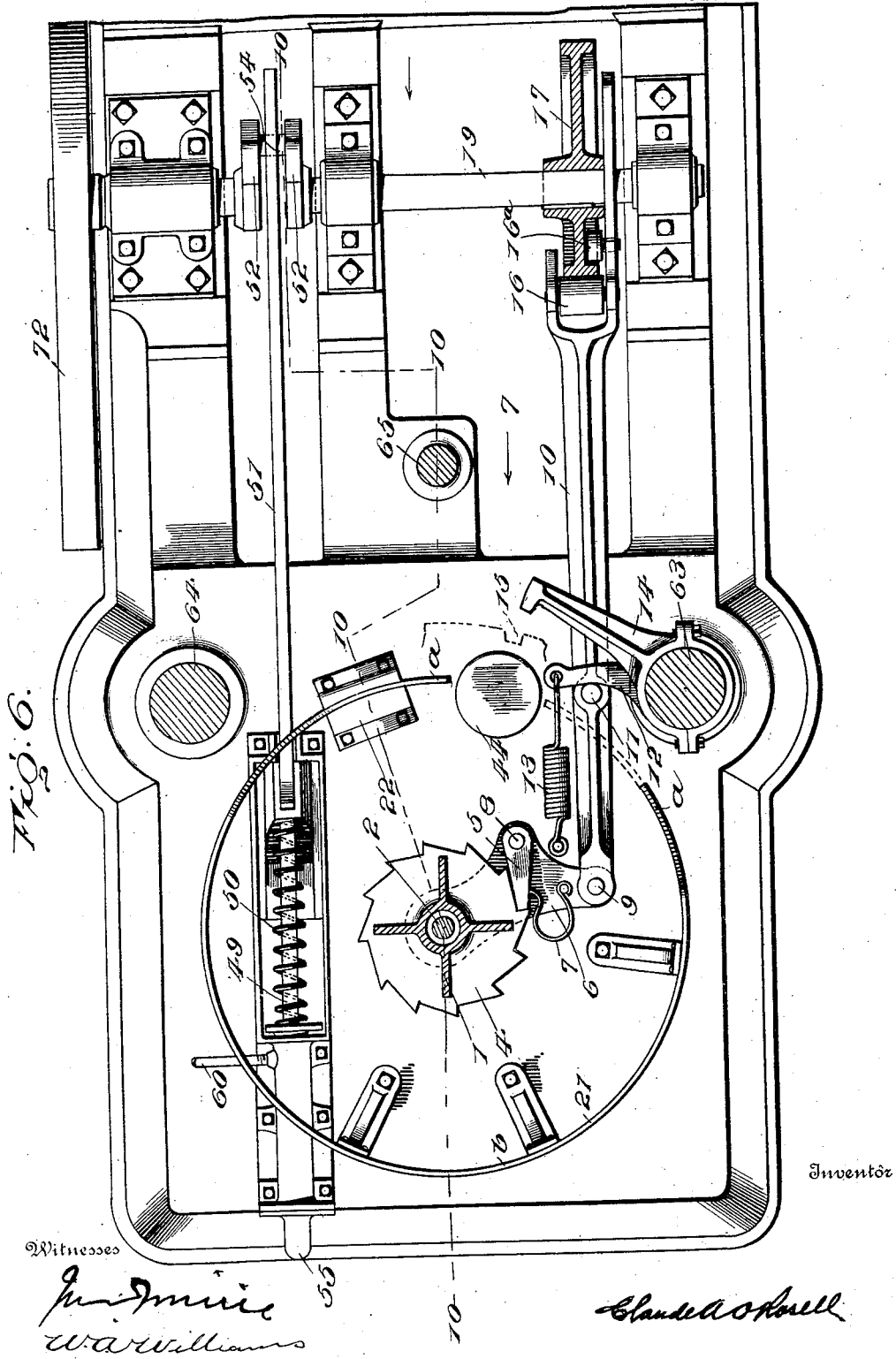

No. 861,903.
PATENTED JULY 30, 1907.
C. A. O. ROSELL
BLOCK PRESS.
APPLICATION FILED JULY 22, 1903.
9 SHEETS—SHEET 4.
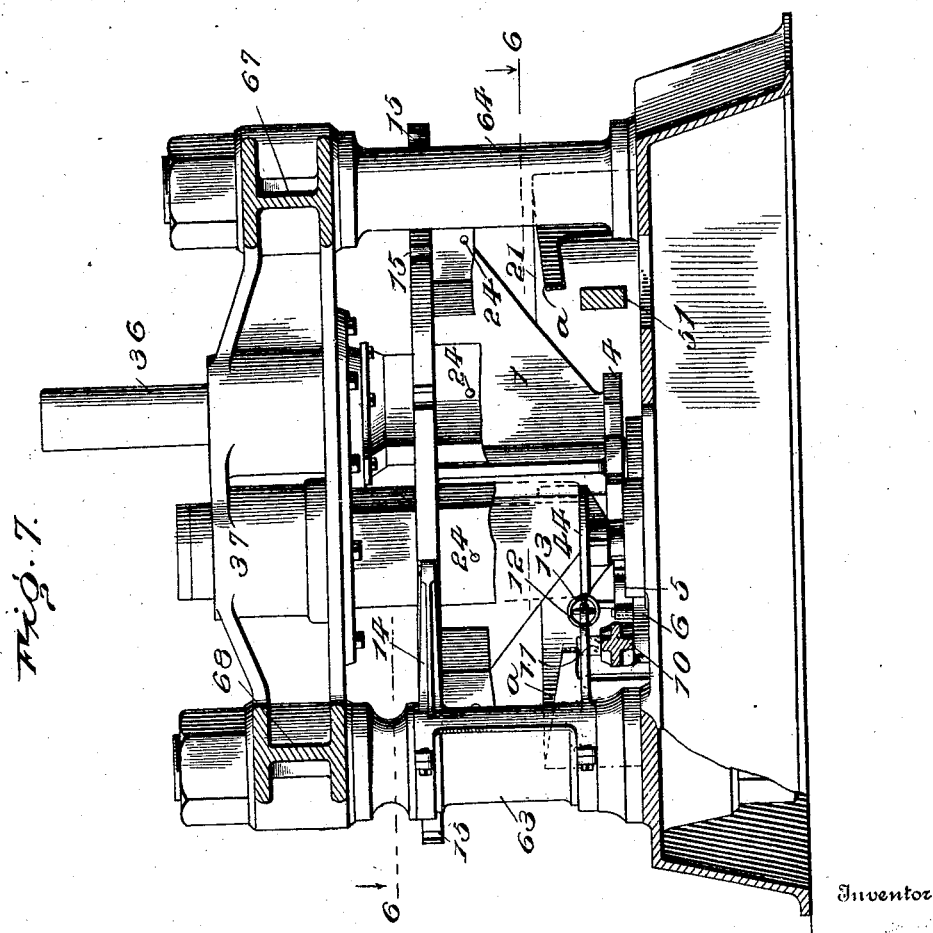
Witnesses
Inventor
Claude A. O. Rosell

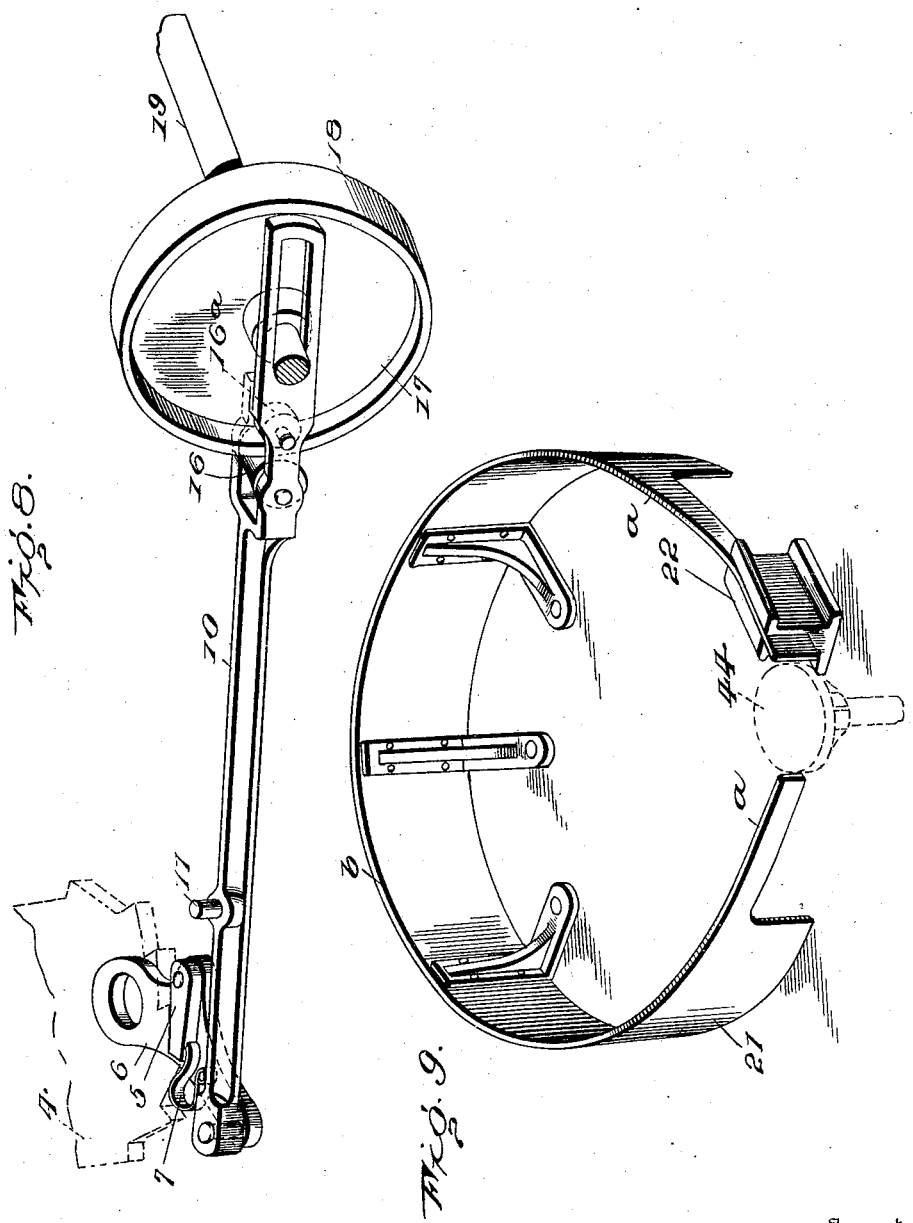

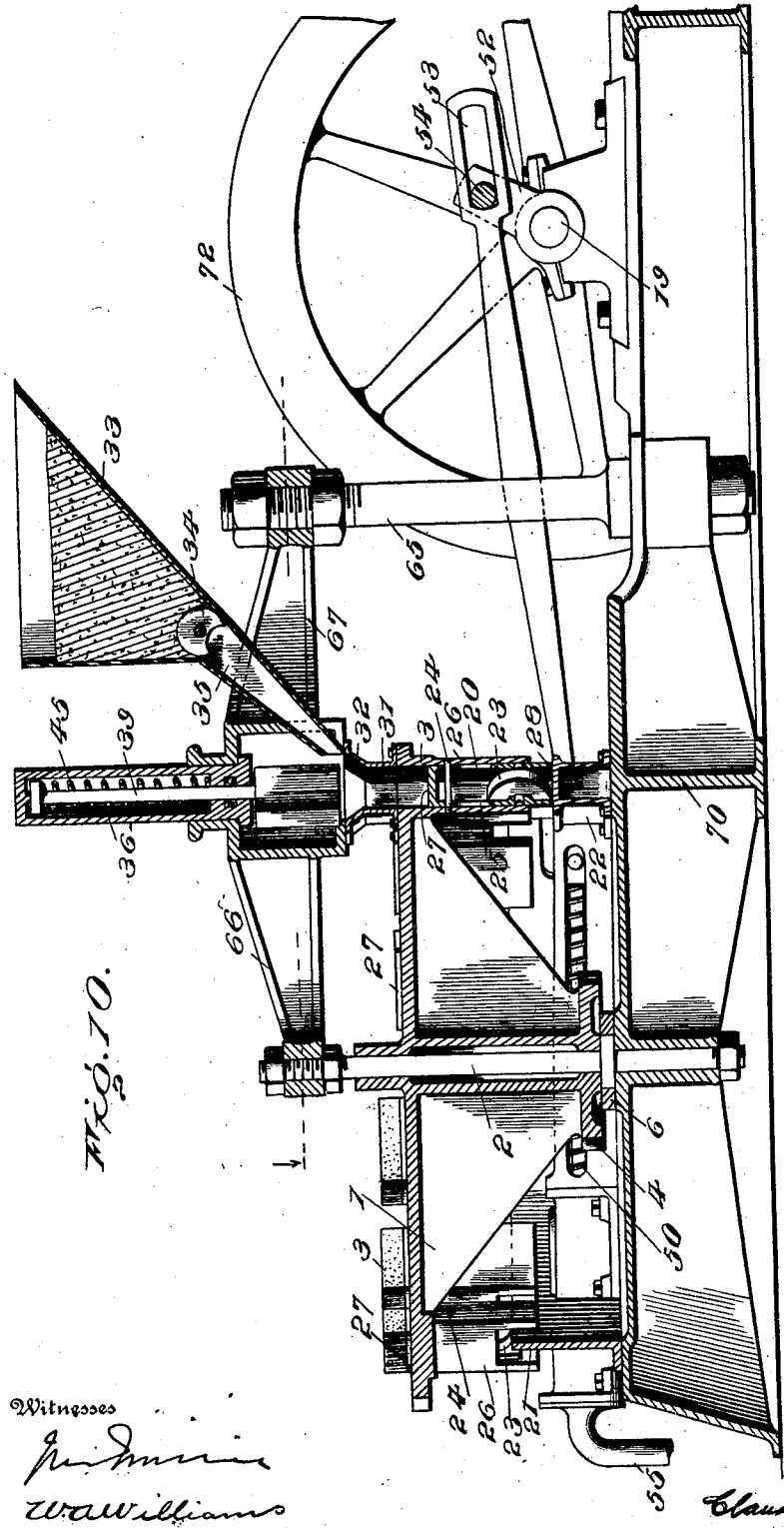

No. 861,903. PATENTED JULY 30, 1907.
C. A. O. ROSELL.
BLOCK PRESS.
APPLICATION FILED JULY 22, 1903.
9 SHEETS—SHEET 9.
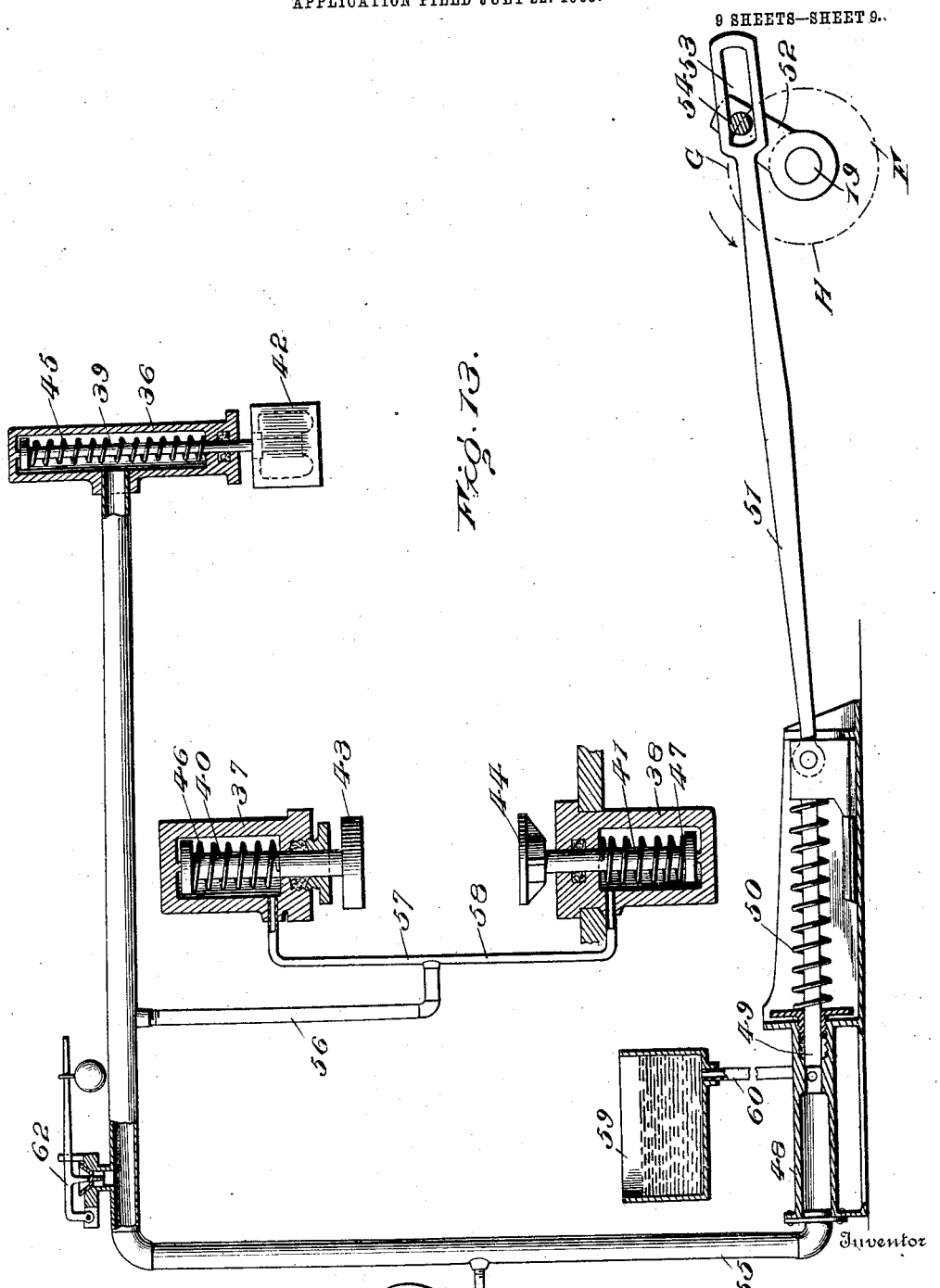
Fig. 13.
Witnesses
Inventor
Claude A. O. Rosell
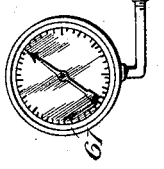
THE NORRIS PETERS CO., WASHINGTON, D. C.

UNITED STATES PATENT OFFICE.

CLAUDE A. O. ROSELL, OF NEW YORK, N. Y., ASSIGNOR, BY MESNE ASSIGNMENTS, TO AVRAM-LEET ENGINEERING COMPANY, OF NEW YORK, N. Y., A CORPORATION OF NEW YORK.

BLOCK-PRESS.

No. 861,903.  Specification of Letters Patent.  Patented July 30, 1907.

Application filed July 22, 1903. Serial No. 166,588.

*To all whom it may concern:*

Be it known that I, CLAUDE A. O. ROSELL, a citizen of the United States, residing at New York, in the county of New York and State of New York, have invented a new and useful Improvement in Block-Presses, of which the following is a specification.

This invention relates to a new form of press for the compression into blocks or bricks of pulverulent material, more especially the mixtures of sand and various binding agents, such as lime, used in the manufacture of steam indurated stone.

In presses for compressing loose clay, or ordinary brick presses, the usual feeder, called a charger, drags an excess of material to be fed over the molds and afterwards drags back the excess. Such a feeding device, which may be called a drag feeder, is ill adapted for use on presses for compressing material, consisting principally of sand, on account of the great wear on the rubbing parts caused thereby. In other forms of brick presses the material used has sometimes also been fed under pressure by means of pressure feeders, but such devices are still less adapted for use in the compression of material consisting mainly of sand.

To avoid the objection to the two classes of existing feeders, viz., pressure feeders and drag feeders, I have devised a new type of feeder in which the material does not come in frictional contact with the upper portion of the mold and which, therefore, may be called a frictionless feeder.

Another difficulty in the manufacture of steam indurated stone is that the material when first compressed is extremely tender, so that a very slight jarring or other disturbance will cause mutilation or breakage. To overcome this objection I have devised a machine which, while otherwise highly efficient, will push a brick very gradually out of the mold. To realize these improved results I make use of a rotary mold press in which I have introduced several improvements whereby high pressure is simultaneously imparted from both sides of the mold, and air is readily eliminated in the compression of the blocks. Further, by giving the blocks a preliminary pressure I reduce to a minimum the amplitude of reciprocation of the plungers that produce the final pressure, realizing in one operation all the advantages obtained in the usual way of first forming a brick and then repressing it in a separate machine.

The invention will now be described by a brief description of the figures of the drawing, a detailed description of the elements shown in these figures, a description of the operation of the machine, a résumé of certain features of the invention and appended claims.

Figure 12:
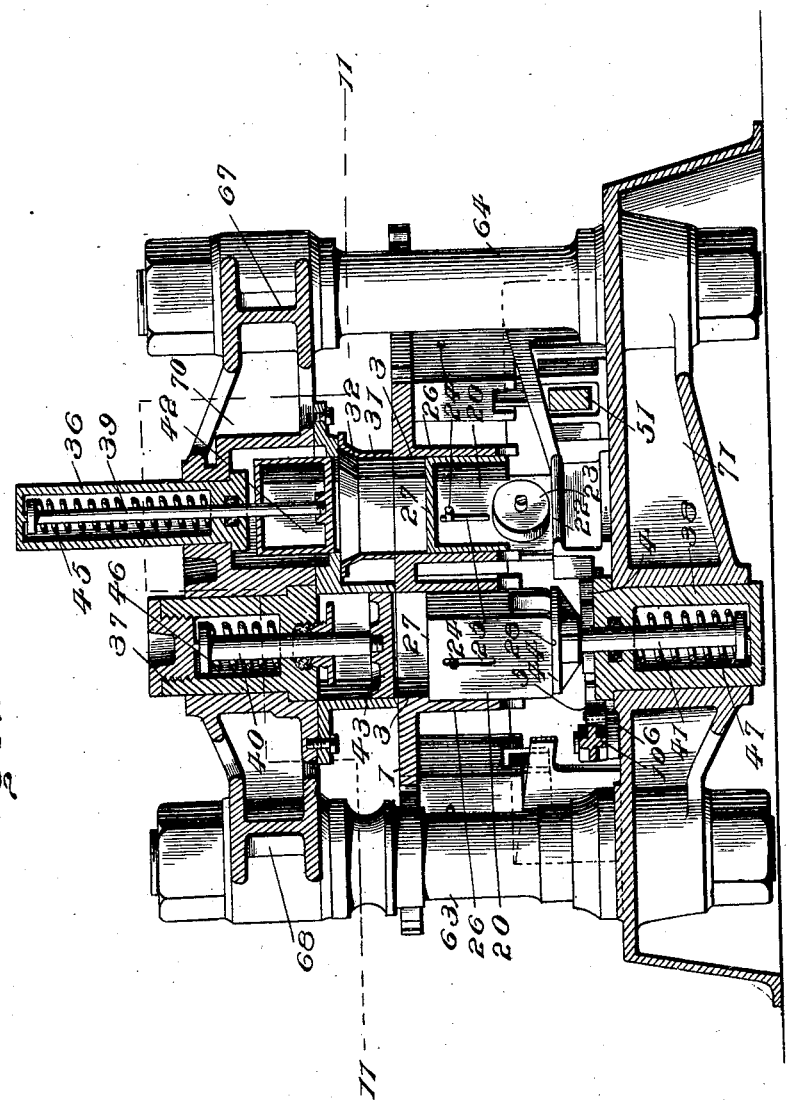

In the drawings, Figures 1 to 4, inclusive, constitute a group indicating different phases of the operation of forming a block by my machine. In this group: Fig. 1 is a vertical section of the stationary mold box, hoppers, feed rollers, spouts and the preliminary pressure plunger, showing material deposited in the mold and about to receive the preliminary pressure. An ejector and the stool upon which it rests during the preliminary compression are also shown. Fig. 2 is a similar view, showing the material after completion of the preliminary pressure indicated by the arrow. Fig. 3 is a similar view, showing the material after completion of the final pressure, which has been given by a second upper pressure plunger, coöperating with a lower plunger acting upon the ejector and through this upon the under side of the material, the compression being indicated by the distance of the pressing surfaces from the dotted lines. Fig. 4 is a vertical section, showing an ejector raised by the ejector cam. The ejector supports a compressed block in a position where it may readily be removed. In the other drawings: Fig. 5 is a plan view, showing the rotary table, the molds, the locking pawl, the shaft around which the table revolves and the standards of the press in section. Fig. 6 is a sectional plan on lines 6—6 of Fig. 7 and showing the lower part of the machine, principally the mechanism for intermittently rotating the table. Fig. 7 is an elevation looking in the direction of arrow 7 in Fig. 6, showing the locking pawl, notches in which it locks, the finger 12, the reciprocating bar 10 and the lug 11 which engages the finger 12. Fig. 8 is a detail view, showing the cam wheel which actuates the bar connected with the actuating pawl. Fig. 9 is a view of the cam upon which the ejectors travel, called the ejector cam. Fig. 10 is a longitudinal vertical section on the broken line 10—10 of Fig. 6, showing the mold table, the preliminary pressure plunger, the stationary mold box, an ejector on the stool 22 and a charging hopper. Fig. 11 is a sectional plan on line 11—11 of Fig. 12, showing the table, its molds and notches, the standards of the press and the two upper rams of the press. Fig. 12 is a vertical longitudinal section on line 12—12 of Fig. 5, showing the stationary mold box, the preliminary pressure plunger, the two main pressure plungers, an ejector between these two plungers and an ejector below the preliminary pressure plunger. Fig. 13 is a schematic view, showing the transmission of power to the various plungers.

Omitting the various other respective figures, in which the same elements are shown, in Fig. 5, 1 is the revoluble table, 2 the shaft upon which the table is mounted, 3 is the molds. The molds are shown as flat, but molds in which the blocks or bricks are pressed on the edges, or edge molds may be used without any other change in the press or mold table.

In Fig. 6, 4 is a ratchet wheel attached to the table and imparting intermittent motion to it by means of the actuating pawl 5 on the rocking arm 6. The spring 7 presses against the pawl 5 which is pivoted at 8. 9 is a pin connecting the rocking arm 6 with the reciprocating bar 10. 11 is a lug or pin on the reciprocating bar 10, and 12 is a finger connected with a spring 13. 14 is a locking pawl engaging in notches 15. The finger 12 is rigidly connected with the pawl 14, as shown in Fig. 7, so that when the lug 11 engages the finger 12 at the end of the back stroke of the reciprocating bar 10 the pawl 14 is lifted out of the notch 15. When the bar 10 moves forward it allows the locking pawl 14 to move under tension of spring 13 toward the table, but allows it to come in contact with the edge of the table only after the table has been started by engagement of pawl 5 with the ratchet wheel, and the notch has cleared the pawl, after which the pawl 14 bears against the edge of the table under tension of spring 13 ready to drop into the next notch and again lock the table. 16 and 16ª are friction rollers pressing against the cam wheel 17. The cam wheel 17 has an extended circular portion or dwell 18 shown in Fig. 8. 19 is the main shaft.

In Fig. 12, 20 are ejectors, of which there is one for each of the molds in the table.

In Figs. 9 and 12, 21 is the cam upon which the ejectors travel and which may be called ejector cam. In Fig. 12, 22 is a stool upon which the ejector rests while the preliminary pressure is applied. In this instance the face of the ejector is stationary and acts as a pressure plate. 23 are friction wheels one on each ejector. 24 are pins passing through the ejector casings. These pins may be dispensed with, being necessary only to prevent the ejectors from dropping when a discontinuous form of ejector cam is used. These pins move in slots 25 as the ejectors are raised or lowered in the guide boxes or casings 26. 27 is the face of the ejector which presses against the lower surface of the material that is compressed. 28 is the lower surface of the ejector which rests on the stool 22 and the lower platen of the press, respectively, as the material receives the preliminary and the final pressure. On the ejector cam 21 (Fig. 9) there is a lower portion where the ejectors pass over the stool and the lower platen of the press and a higher portion. The lower portion of the ejector cam is indicated by the letter $a$, the higher portion by the letter $b$. 31 is a stationary mold box. Under this each of the molds in the table stops during the intermittent motion of the table and is during this period of rest held in accurate registration therewith. The material used is fed into this stationary mold box. After the material has been charged into the stationary mold box occupying a position shown in Fig. 1, and while the mold below it remains stationary, a preliminary pressure is applied by means of the preliminary plunger. By this preliminary pressure the level of the material is brought down to the level of the table, or slightly below, as shown in Fig. 2. In Fig. 12, 32 is the upper expanded portion of the stationary mold. By means of this expansion no air becomes inclosed by the preliminary plunger previous to pressing and the junction between the stationary mold box gives an outlet for air during the preliminary pressure.

In Figs. 1 and 10, 33 is a feed hopper carrying a feed roller 34, having a pocket large enough to hold the material for half a block to be molded. The feed roller 34 is moved from the main shaft by means of belting or gearing, not shown. 35 is a spout at the end of the hopper. The use of a double set of hoppers, feed rollers and spouts, although not entirely indispensable, has the advantage that the material delivered into the mold is more evenly distributed. 36 is the hydraulic chamber of the preliminary plunger ram. 37 is the hydraulic chamber of the main upper plunger ram, and 38 is the chamber of the main lower plunger ram. 39, 40 and 41 are the rams in the chambers 36, 37 and 38, and 42, 43 and 44 are the plungers or platens carried by these rams, respectively. As illustrated, the rams are shown of relatively less diameter than practically required, although, on account of the great power that in this construction may be brought to bear on the pump plunger, the rams have less diameter than is usual in similar hydraulic apparatus. 45, 46 and 47 are springs which serve to pull back the rams 39, 40 and 41 when the water pressure has been released. One way of constructing the chamber so as to admit the spring is shown in chamber 37. The springs, in place of being placed inside as shown, may also be applied on the outside to stems from the rams, and when the reciprocation of the spring is but slight, flat springs may be used. Besides, other positive means may also be used to bring the rams back to the position in which they are when pressure is to be applied.

In Fig. 13, 48 is the barrel of the pump, 49 the pump plunger, and 50 a spring attached to the pump plunger. 51 is the pitman connected with the pump plunger, 52 the crank for the connecting rod, 53 is a slot in the connecting rod, in which moves the pin 54. 55 is a pipe leading from the pump, and through which water under pressure is conducted. 56 is a side pipe leading from pipe 55 and having two branches 57 and 58 leading to the chambers 37 and 38, respectively. 59 is an elevated water tank, supplying water to the pump and connected with it by pipe 60. 61 is a gage, and 62 a safety valve.

In Fig. 11, 63, 64 and 65 are standards of the press, 66, 67, 68 and 69 are upper braces connecting the standards and the shaft 2 of the table 1. 70 is an upper cross brace, and 71 is a lower cross brace of the press. 72 is a fly wheel.

The operation of the machine is as follows: The shaft 19, by means of the cam wheel 17, the reciprocating bar 10, the actuating pawl 5 and the locking pawl 14, causes the table 1 to revolve with an intermittent motion. The feed rollers 34 deliver definite quantities of material from the hopper, which is supplied by means of a conveyer not shown or by hand. Sufficient material to make a block is delivered while the table is at rest by the feed rollers through the spouts 35 into the stationary mold box 31, filling the mold below and the lower prismatic part of the stationary mold box. Pressure is immediately applied by means of the plunger 42 on the ram 39, which is operated by the pump plunger 49, which latter is actuated by the main shaft 19 through the connecting rod 51 and crank 52. The material which has thus received preliminary pressure is advanced one step with the revolution of the table and is stopped between the main plungers of the hydraulic press. It there receives the final pressure, while simultaneously in the mold next after it a fresh lot of material receives the preliminary pressure. The hydraulic mechanism is especially designed to secure a rapid supply of water at the start and a great pressure at the finish. It accomplishes in one operation what is ordinarily accomplished by a double system of pumps, one furnishing low pressure water and the other high pressure water. This important result is secured by the peculiar form of pump driving mechanism shown, the operation of which is to allow the pump to rest while the pin 54 moves in arc F G from F to G in Fig. 13. The plunger 49 is moved inwardly as the pin is moved from G to H, being moved most rapidly at the start and then with gradually decreasing velocity, but corresponding increase in power as the pin 54 approaches H, the crank arm 52 and the pitman 51 acting as the members of a toggle in a common toggle press. The plunger 49 is caused to move back by the action of spring 50 as the crank 54 moves through arc H I, Fig. 13. Water is automatically supplied to the pump through pipe 60 from water tank 59, while the pump is at rest, communication with the tank being cut off by the plunger 49 at the beginning of its inward stroke. The chambers are all intercommunicating and the dimensions of the piping are such that each press will receive under normal conditions the amount of water required to operate it. The flow of water may further be controlled by the addition of valves, so as to secure any desirable variation in the motion of the rams. After having received the final pressure, the block moves further along with the table. During its travel the ejector passes over the elevated portion of the cam and the block is completely lifted out of the mold ready to be taken off by hand. During the operation there has been no jarring on the block and no material has had an opportunity to press or drag on the surface of the table.

The invention described, although adapted primarily for the compression of blocks to be steam indurated, has other uses, such, for instance, as the compression of ordinary clay in the manufacture of clay bricks and the compression of other pulverulent material that may be desired in block form, such as sodium chlorid.

Although a hydraulic press has been shown, it is evident that many of the advantages described may be realized with the use of a toggle joint press or other form of a mechanical press. It may also be noted that certain of the advantages of this invention may be realized if a stationary mold is used in place of a rotary mold. All of these and other features are intended to be included as broadly as the state of the art will admit in the following, which I claim as new:

1. In a block press, the combination of a mold table having a mold opening therein, a mold box, the table and box being movable relatively to each other, and means for giving one of said elements alternate periods of rest and motion, said mold box being adapted to register with said mold opening during periods of rest, means for supplying material to said box and a plunger for forcing material out of said box and into said mold opening and exerting a preliminary pressure on the contents of said mold opening during the periods of rest in which the box registers with said mold opening.

2. In a block press, the combination of a mold table having a mold opening therein, a mold box, the table and box being movable relatively to each other, and means for giving one of said elements alternate periods of rest and motion, said mold box being adapted to register with said mold opening during periods of rest, means for supplying material to said box and a plunger for forcing the material within said box entirely out of said box and into said mold opening, and exerting a preliminary pressure on the material within said mold opening during a single period of rest.

3. In a block press, the combination of a mold table having a mold opening therein, a mold box, the table and box being movable relatively to each other, and means for giving one of said elements alternate periods of rest and motion, said mold box being adapted to register with said mold opening during periods of rest, means for supplying material to said box during a period of rest, and means for forcing the material within said box entirely out of said box and into said mold opening, and exerting a preliminary pressure on the material within said mold opening during the same period of rest in which the material was supplied to said box.

4. In a block press, the combination of a movable mold table having a mold opening, means for giving said table alternate periods of rest and motion, means for filling said mold opening during a period of rest, and means for also exerting a preliminary pressure on the contents of said mold opening during the same period of rest, and means for exerting final pressure on the contents of said mold opening during a succeeding period of rest.

5. In a block press, the combination of a movable mold table having a plurality of mold openings, means for giving said table alternate periods of rest and motion, means for filling one of said mold openings during a period of rest, means for also exerting a preliminary pressure on the contents of said mold opening during the same period of rest, and means for exerting during said period a final pressure on the contents of a previously filled mold opening.

6. In a block press, the combination of a movable mold table having a plurality of mold openings, means for giving to said table alternate periods of rest and motion, a stationary mold box registering with said mold opening successively during the intervals of rest, means for forcing the contents of said mold box entirely out of said mold box and into said mold opening and also subjecting it to a preliminary pressure during the same interval of rest and means for subjecting the contents of said mold opening to an increased pressure during a succeeding interval of rest.

7. In a block press, the combination of a movable mold table having a plurality of mold openings, means for giving to said table alternate periods of rest and motion, a stationary mold box registering with one of said mold openings during each interval of rest, means for feeding to said mold box a definite amount of material to be compressed, means for forcing the contents of said mold box entirely out of said box and into said mold opening and also subjecting it to a preliminary pressure during the same interval of rest, and means for subjecting the contents of said mold opening to an increased pressure during a succeeding interval of rest.

8. In a block press, the combination of a rotary mold table, a hydraulic ram, a pump plunger to operate the ram, and mechanical means for timing the operation of the table and the pump plunger.

9. In a block press, the combination of a rotary mold table, means for charging material into the molds, means for simultaneously imparting hydraulic pressure to the material from both sides of the mold, and means for ejecting the compressed material while the table is in motion.

10. In a block press, the combination of a rotary mold table means for charging material into the molds, means for simultaneously imparting hydraulic pressure to the material from both sides of the mold, and means for ejecting the compressed material from below, while the table is in motion.

11. In a block press, the combination of a rotary mold table means for imparting intermittent motion thereto, means for charging material into the molds, means for imparting a preliminary hydraulic pressure to the material in the molds while the mold table is at rest, means for imparting final hydraulic pressure from both sides of the mold to the partially compressed material, and means for ejecting the material while the table is in motion.

12. In a block press, the combination of a rotary mold table, a plunger for imparting preliminary hydraulic pressure, plungers for imparting final hydraulic pressure to the partly compressed material and mechanical means for timing the operation of the table and the plungers.

13. The combination of a rotary mold table, a hydraulic plunger, located below the table, an ejector traveling with the table to eject the compressed material from below and means for passing it above the plunger.

14. In a block press, the combination of a rotary mold table an upper and a lower hydraulic plunger and an ejector traveling with the table and adapted to pass between the upper and the lower plunger.

15. In a block press the combination of a rotary mold table, an ejector provided with a wheel, a cam for the wheel, a platen in the course of the cam over and in contact with which the ejector is adapted to pass without contact with the wheel.

16. A rotary mold table, a ratchet wheel, an actuating pawl for revolving the same, a locking pawl, adapted to engage with and hold the table, a reciprocating bar for operating the said actuating pawl and adapted to lift the locking pawl out of engagement with the table at the end of the return stroke of said bar, and a spring attached to the locking pawl, to keep the same in engagement with the table.

17. In a hydraulic press the combination of a rotary mold table, an ejector traveling with the table, a ram carrying a platen to impart preliminary pressure, two rams carrying platens to impart final pressure and a pump adapted to simultaneously impart motion to the three rams.

18. In a hydraulic press, the combination of a rotary mold table ejectors traveling with this table, a ram carrying a platen, to impart preliminary pressure, two rams carrying platens to impart final pressure, and a plunger adapted to simultaneously and with a single stroke impart a full pressure motion to the three rams.

19. In a hydraulic press, the combination of a rotary mold table, ejectors revolving with the table, an upper and a lower ram, and means for simultaneously imparting motion to the rams.

20. In a hydraulic press, the combination of an upper ram, a lower ram and a mechanically operated plunger adapted to simultaneously and with a single stroke impart a full pressure motion to the rams.

21. In a hydraulic press, the combination of a rotary mold table, ejectors traveling with the table, an upper ram, a lower ram and a plunger adapted to simultaneously and with a single stroke impart a full pressure motion to the rams.

22. In a hydraulic press, a chamber containing an upper ram, a chamber containing a lower ram, a conduit between the chambers to equalize the pressure on the rams and a mechanically operated plunger adapted to simultaneously and with a single stroke impart a full pressure motion to the rams.

23. In a hydraulic press, the combination of a rotary mold table, ejectors traveling with the table, a chamber containing an upper ram, a chamber containing a lower ram, a conduit between the chambers to equalize the pressure on the rams, and a plunger adapted to simultaneously and with a single stroke impart a full pressure motion to the rams.

In testimony whereof I have signed my name to this specification in the presence of two subscribing witnesses.

CLAUDE A. O. ROSELL.

Witnesses:
ALEX FRANKLIN,
W. A. WILLIAMS.